United States Patent
Valenzona et al.

(10) Patent No.: US 6,174,063 B1
(45) Date of Patent: Jan. 16, 2001

(54) DISPLAY APPARATUS

(75) Inventors: Joseph Flor Valenzona, Cypress; Peter Miller, Corona, both of CA (US)

(73) Assignee: Eaton Corporation, Cleveland, OH (US)

(*) Notice: Under 35 U.S.C. 154(b), the term of this patent shall be extended for 0 days.

(21) Appl. No.: 09/126,496

(22) Filed: Jul. 30, 1998

(51) Int. Cl.[7] .................................................. G01D 11/28
(52) U.S. Cl. ............................................ 362/23; 362/800
(58) Field of Search .................................. 362/293, 800, 362/23, 26, 31

(56) References Cited

U.S. PATENT DOCUMENTS

| | | | |
|---|---|---|---|
| 4,803,599 | * | 2/1989 | Trine et al. ........................... 362/249 |
| 5,140,220 | * | 8/1992 | Hasegawa ............................. 313/512 |
| 5,531,181 | * | 7/1996 | Cookingham ......................... 116/288 |

* cited by examiner

Primary Examiner—Thong Nguyen
Assistant Examiner—Mark A. Robinson
(74) Attorney, Agent, or Firm—Tarolli, Sundheim, Covell, Tummino & Szabo L.L.P.

(57) ABSTRACT

A display apparatus includes a solid state light-emitting element which is mounted on a base in an orientation so that light can be transmitted to a viewer from opposite major sides of the solid state light emitting element. To enable light to be transmitted to a viewer from opposite major sides of the solid state light-emitting element, the solid state light-emitting element is mounted in an on-edge orientation. To mount the solid state light emitting element in an on-edge orientation, support pins engage opposite minor side or edge surfaces of the solid state light emitting element and support it with the major side surfaces of the solid state light emitting element exposed and extending perpendicular to the mounting surface on the base.

18 Claims, 3 Drawing Sheets

DISPLAY APPARATUS

BACKGROUND OF THE INVENTION

The present invention relates to a new and improved display apparatus and more specifically to a display apparatus having a solid state light-emitting element which provides light transmitted to a viewer.

Many different known types of display apparatus have utilized solid state light emitting elements, such as light emitting diodes, as light sources. These solid state light emitting elements (LEDs) have previously been surface mounted with a major side surface of the light emitting element facing toward a base. This results in the base blocking the transmittal of light from one side of the solid state light-emitting element to a viewer.

SUMMARY OF THE INVENTION

The present invention relates to a new and improved display apparatus having solid state light emitting element as a source of light. The solid state light emitting element is mounted on a base with opposite major sides of the solid state light emitting element exposed. This enables light to be transmitted from opposite sides of the solid state light-emitting element to a viewer. A housing of the display apparatus includes a base on which the solid state light emitting element is supported in an on-edge orientation by a pair of support pins.

A display section of the housing may contain a recess in which the solid state light emitting element and, if desired, a filter assembly, are disposed. Light transmitted from opposite major side surfaces of the solid state light emitting element is conducted through transparent material of the display section to a translucent display surface.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
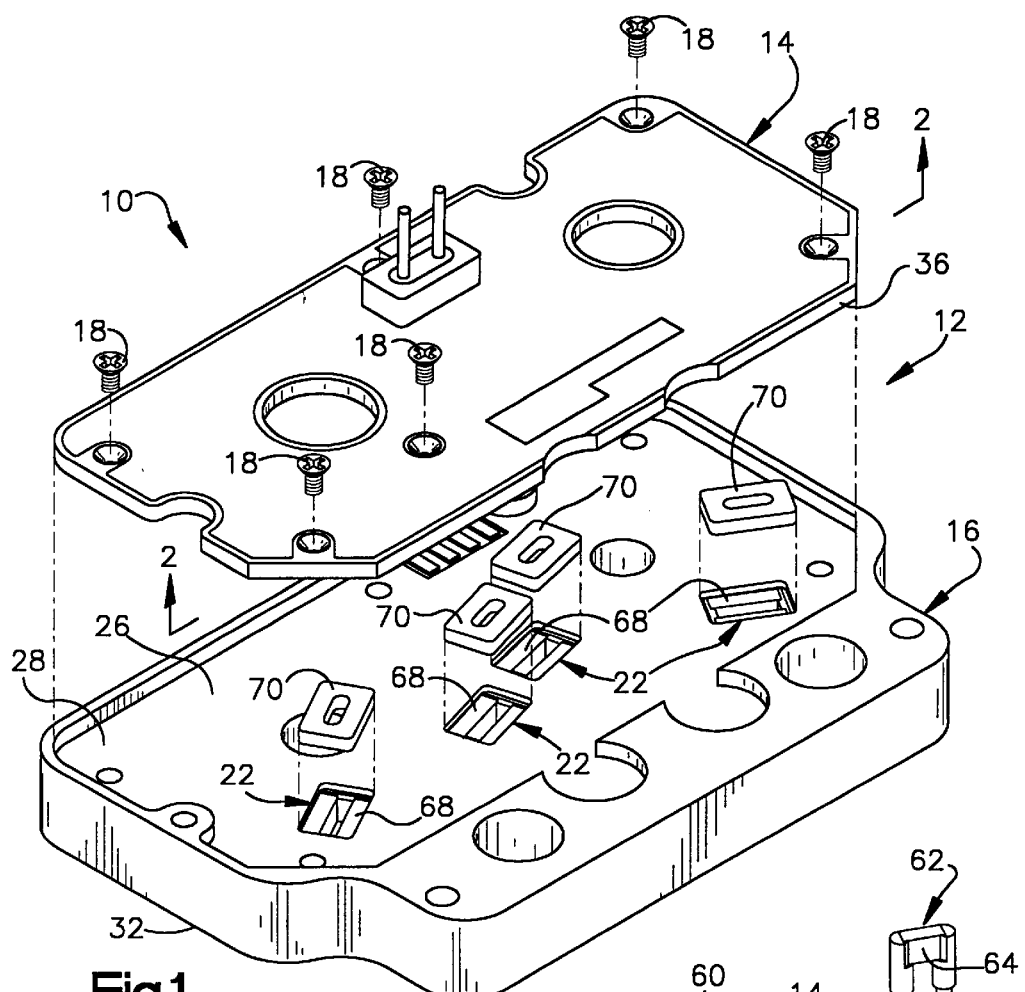
FIG. 1 is a partially exploded pictorial illustration of a display apparatus constructed in accordance with the present invention, the display apparatus being oriented with a display section facing downward in an outer side surface of a base facing upward.

A display apparatus 10, constructed in accordance with the present invention, is illustrated in FIG. 1. The display apparatus 10 includes a housing 12. The housing 12 is has a base 14 which is connected with a display section 16 by suitable fasteners (screws) 18.

The display section 16 includes a plurality of recesses 22. The base section 16 is formed of a transparent polymeric material, that is, a clear acrylic material, into which the recesses 22 extend. An inner side surface 26 of the display section 16 is disposed on a layer 28 of opaque material which is disposed on the clear acrylic material of the display section. In addition, the display section 16 includes an outer side or display surface 32 disposed on a layer of translucent material. It is contemplated that the display apparatus 10 may be mounted in a control panel, such as a control panel of an aircraft, with the outer side surface 32 facing toward a viewer and the base 14 concealed from the viewer.

The base 14 (FIG. 2) is a printed circuit board having a panel 36 formed of electrically insulating material. Layers formed of electrically conductive material are disposed on the panel 36 and are electrically insulated from each other in accordance with well known printed circuit board fabrication techniques.

A main conductive layer 38 (FIG. 2) is disposed on the panel 36. A secondary conductive layer 40 is also disposed on the panel 36. Conductive strips 42, 44 and 46 are disposed on the panel 36 and are electrically insulated from each other and from the main and secondary conductive layers 38 and 40. The main and secondary conductive layers 38 and 40 and conductive strips 42, 44 and 46 cooperate with each other and electrically insulating material of the base 36 to form a mounting surface 47.

Terminals 48, 50, 52 and 54 are connected with the conductive strips 42, 44 and 46 and the secondary conductive layer 40. When the display apparatus 10 is disposed on a control panel, the terminals 48–54 may be selectively connected with an electrically positive source. The main conductive layer 38 may be connected with an electrically negative source.

Light sources 56, 58, 60 and 62 (FIG. 2) are mounted on the mounting surface 47 of the base 14. In accordance with a feature of the present invention, each of the light sources 56–62 includes a solid state light emitting element 64 which is mounted in an on-edge orientation on the base 14. In the illustrated embodiment of the invention, the solid state light emitting elements 64 are light emitting diodes having a known construction. However, other solid state light emitting elements could be utilized if desired.

Figure 6:
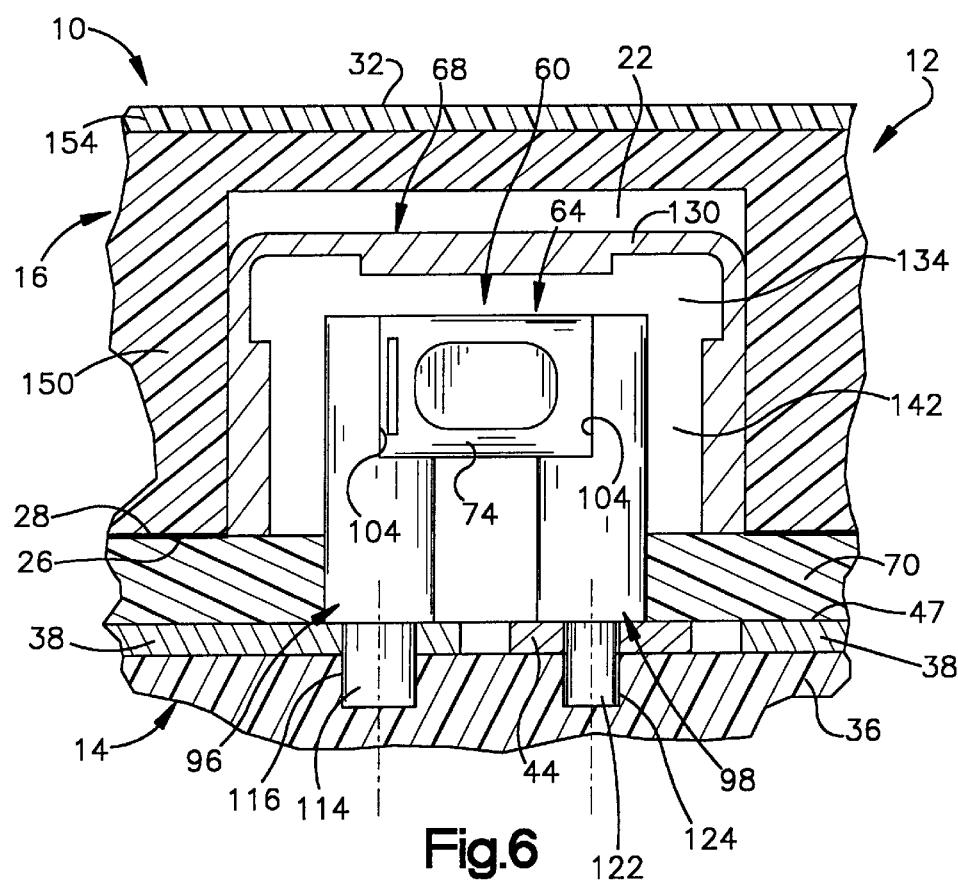
FIG. 6 is an enlarged fragmentary sectional view illustrating the manner in which one of the solid state light emitting elements is mounted on a base and extends into a filter assembly disposed in a recess in the display section of the housing of FIG. 1.

When the base 14 is connected with the display section 16 (FIG. 1), the light sources 56–62 are received in the recesses 22 in the display section 16. The manner in which one of the light sources 60 extends into one of the recesses 22 in the display section 16 is illustrated in FIG. 6. In FIG. 6, the display apparatus 10 is oriented so that the outer side 32 of the display apparatus faces upward rather than downward as illustrated in FIG. 1.

Figure 2:
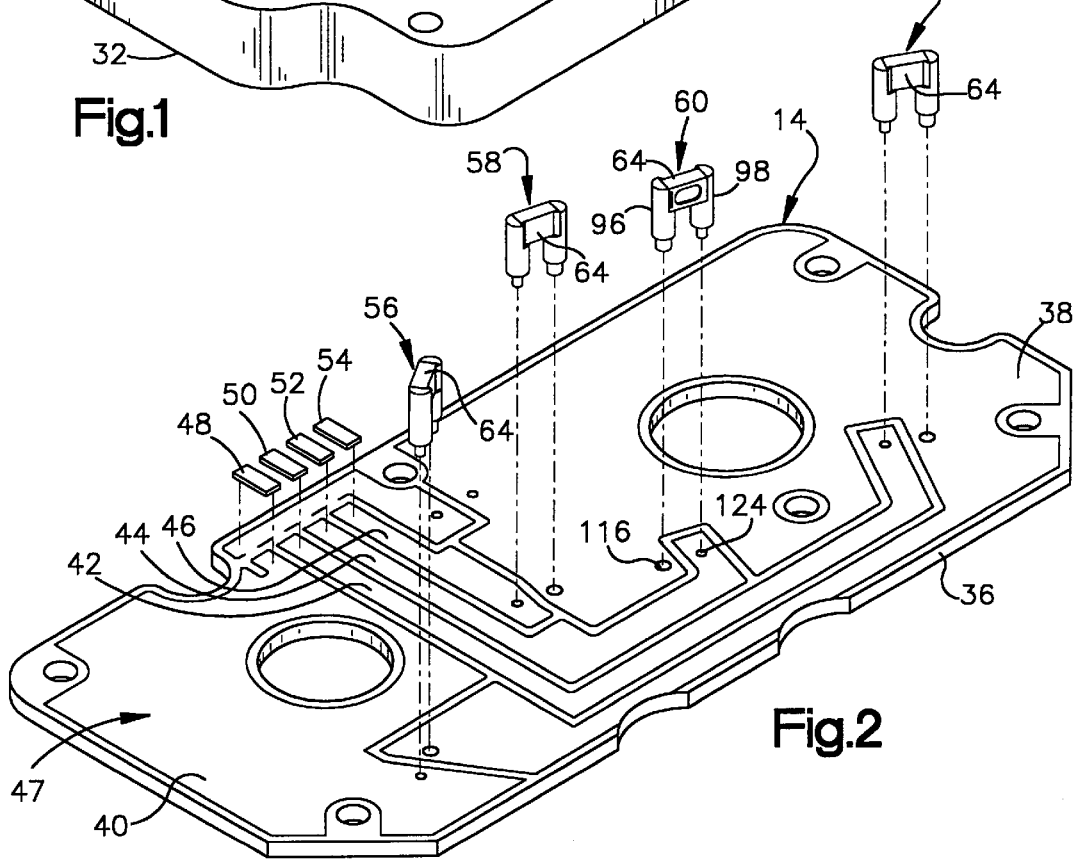
FIG. 2 is a pictorial illustration, taken generally along the line 2—2 of FIG. 1, illustrating the manner in which a plurality of solid state light emitting elements are mounted in an on-edge orientation on an inner side of the base of the display apparatus.
Figure 5:
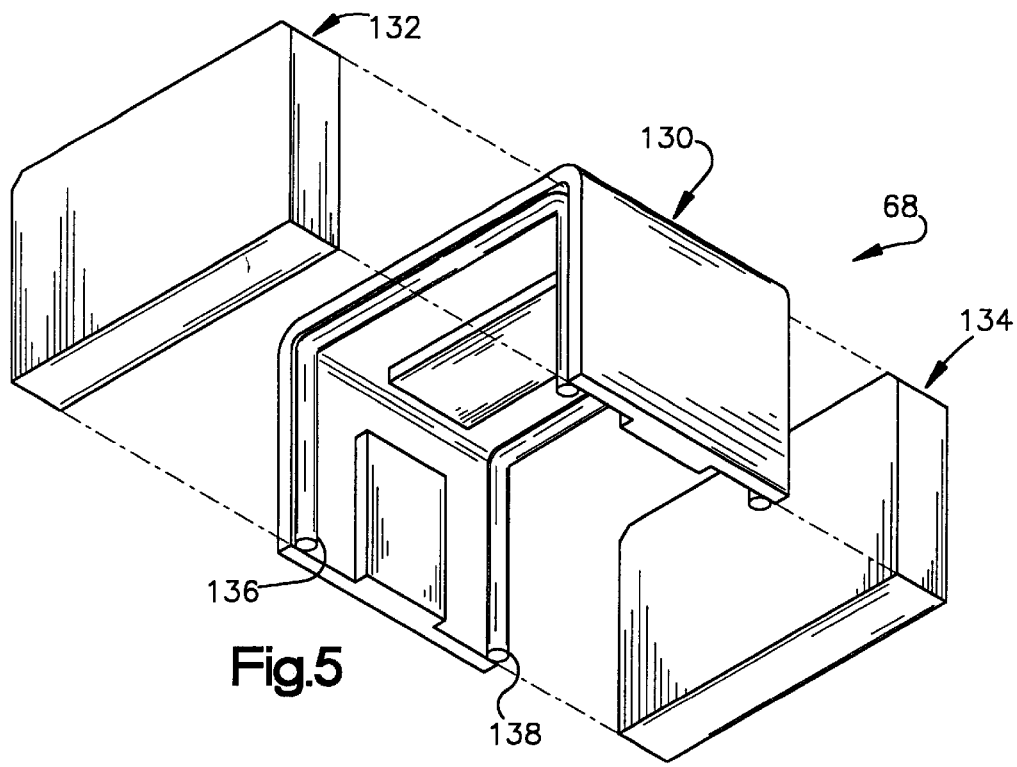
FIG. 5 is an exploded perspective view of a filter assembly which may be utilized in association with one of the solid state light emitting elements of FIG. 2.

In the illustrated embodiment of the invention, filter assemblies 68 (FIG. 5) are disposed in the recesses 22 in association with the light sources 56–62 (FIGS. 1 and 2). The filter assemblies 68 absorb light of a predetermined wavelength emitted by the solid state light emitting elements 64. Resilient seals 70 (FIG. 1) are compressed between the base 14 and display section 16 to prevent the leakage of light from the recesses 22 when the solid state light emitting elements 64 are energized.

It is contemplated that the display apparatus 10 may be utilized in environments where the filter assemblies 68 and/or seals 70 are not required. However, when the display apparatus 10 is utilized in association with a, control panel of an aircraft, it is believed that the filter assemblies 68 and seals 70 may be desired to facilitate the use of night vision optical equipment.

Light Source

In accordance with a feature of the present invention, each of the light sources 56–62 (FIG. 2) includes a solid state light emitting element 64 which is supported in an on-edge orientation. The solid state light emitting elements 64 have a rectangular configuration. However, the solid state light emitting elements 64 could have a different configuration if desired.

Figure 3:
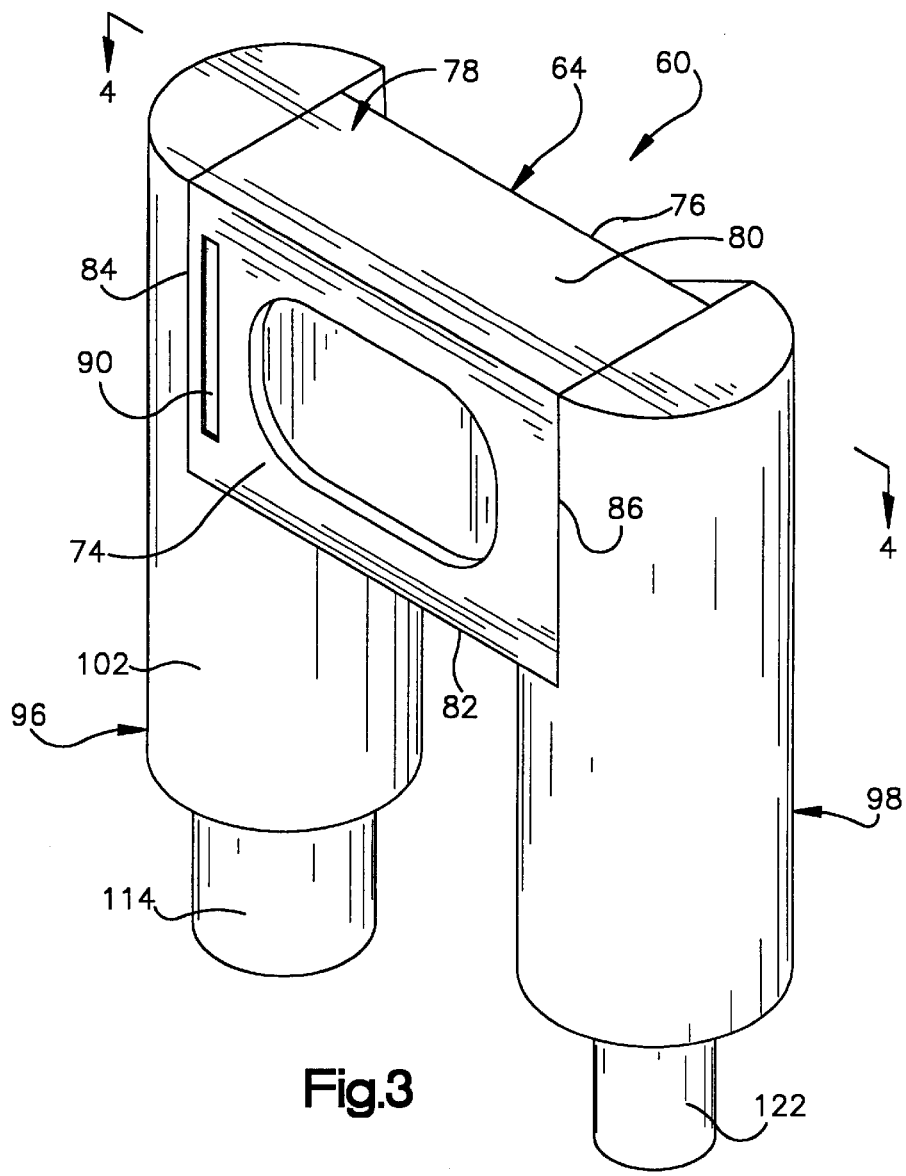
FIG. 3 is an enlarged pictorial illustration depicting the manner in which one of the solid state light emitting elements is mounted in an on-edge orientation on a plurality of support pins.

The solid state light emitting element 64 of the light source 60 (FIG. 3) includes a pair of major sides 74 and 76 which face in opposite directions and extend parallel to each other. The solid state light-emitting element 64 includes a rectangular array 78 of minor sides which interconnect the major sides 74 and 76. Thus, upper and lower (as viewed in FIG. 3) parallel minor sides 80 and 82 extend between the major sides 74 and 76 of the solid state light emitting element 64. In addition, upright (as viewed in FIG. 3) parallel minor sides 84 and 86 extend between the major sides 74 and 76. The minor sides 80–86 and the major sides 74 and 76 all have rectangular configurations.

The upright minor sides 84 and 86 form the cathode and anode terminals of the solid-state light-emitting element 64. Thus, the upright minor side 84 is the cathode terminal while the upright minor side 86 is the anode terminal of the solid state light emitting element 64. A cathode mark 90 is provided adjacent to the minor side 84 which forms the cathode terminal of the solid state light emitting element 64.

When an electrical potential is established between the upright minor sides 84 and 86 of the solid state light emitting element 64, light is emitted from the opposite major sides 74 and 76 of the solid state light emitting element. The light emitted from the major side 74 of the solid state light emitting element 64 is transmitted toward the left (as viewed in FIG. 3). The light emitted from the major side 76 of the solid state light emitting element 64 is transmitted toward the right (as viewed in FIG. 3).

Since the solid state light emitting element 64 is mounted in on-edge orientation, light can be transmitted in opposite directions from the major side surfaces 74 and 76 of the solid state light emitting element. If the solid state light emitting element 64 was surface mounted in a known manner, the transmission of light from the major side surface 76 would be blocked by the mounting of the solid state light emitting element. Of course, this would substantially decrease the intensity of the light source 60.

Figure 4:
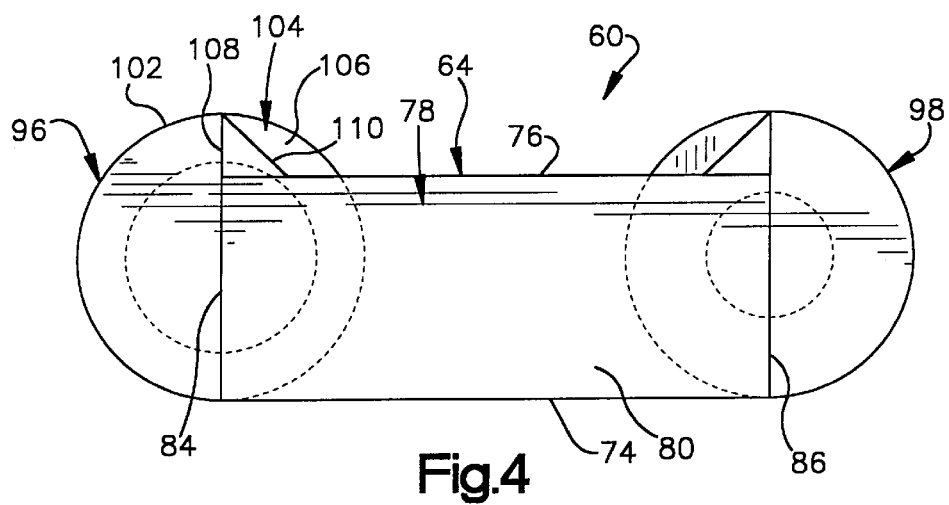
FIG. 4 is a top plan view, taken generally along the line 4—4 of FIG. 3, further illustrating the relationship of the solid state light emitting element to the support pins.

In the illustrated embodiment of the invention, a pair of parallel support pins 96 and 98 are utilized to support the solid state light emitting element 64 in an on-edge orientation. The support pin 96 (FIG. 3) includes a cylindrical outer side surface 102 which is cut away to form a ledge 104 (FIG. 4) on which the solid state light emitting element 64 is disposed. The ledge 104 is formed by a flat, semi-circular, radially extending surface 106 and a flat, rectangular, axially extending surface 108 which extends perpendicular to the radially extending surface 106. The axially extending surface 108 on the support pin 96 is coextensive with the flat rectangular upright minor side surface 84 which forms the cathode terminal for the solid state light emitting element 64. A solder fillet 110 mechanically and electrically connects the solid state light emitting element 64 with the electrically conducting support pin 96.

The support pin 96 has a cylindrical mounting section 114 which is received in a matching opening 116 (FIG. 2) in the base 14. The cathode terminal, that is, the upright minor side surface 84, of the solid state light emitting element 64 (FIG. 3) is electrically connected with the main conductive layer 38 (FIG. 2) on the base 14 by engagement of the electrically conductive (brass) support pin 96 with the main conductive layer 38.

The opposite support pin 98 (FIG. 3) has the same general construction as the support pin 96. However, the support pin 98 differs from the support pin 96 in that the support pin 98 has a cylindrical mounting section 122 with a smaller diameter than the mounting section 114 on the support pin 96. Therefore, an opening 124 (FIG. 2) in which the mounting section 122 on the support pin 98 is received is smaller in diameter than the opening 116 in which the mounting section 114 of the support pin 96 is received. This is done to ensure that the light source 60 is mounted in the desired orientation on the base 14.

The support pin 98, like the support pin 96, is formed of an electrically conductive material (brass). The support pin 98 electrically connects the upright minor side surface 86, which forms the anode terminal of the solid state light emitting element 64, with the conductive strip 44 (FIG. 2) on the base 14. The conductive strip 44 is electrically insulated from adjacent conductive strips 42 and 46 and from the main conductive layer 38 and secondary conductive layer 40. This enables an electrical potential to be established between the support pins 96 and 98 when the light source 60 is mounted on the base 14.

Filter Assembly

The filter assembly 68 (FIG. 5) includes a filter housing 130. The filter housing 130 encloses a pair of identical filters 132 and 134. A pair of seals 136 and 138 are connected with the filter housing 130 by a suitable adhesive. In addition, the filters 132 and 134 are connected with the housing 130 and the seals 136 and 138 by adhesive.

The filter assembly 68 is positioned in one of the recesses 22 (FIG. 1) in the display section 16 of the housing 12. The filters 132 and 134 (FIG. 5) are disposed in engagement with the clear acrylic material of the base section 16. One of the light sources, for example the light source 60 (FIG. 6) extends into a chamber 142 formed in the filter assembly 68. The light source 60 is spaced from the filters 132 and 134 and from the filter housing 130. However, the light source 60 is enclosed by the filter assembly 68 so that all of the light which is transmitted from the light source 60 into the clear acrylic material of the display section 16 is transmitted through one of the filters 132 or 134. The filters 132 and 134 are designed to absorb unwanted wave lengths of light from the light emitted from opposite major sides 74 and 76 (FIGS. 3 and 4) of the solid state light emitting element 64.

Mounting of Light Source

The manner in which the light source 60 is mounted in the housing 12 is illustrated in FIG. 6. The support pins 96 and 98 for the solid state light-emitting element 64 of the light source 60 are received in the holes 116 and 124 in the panel 36. The left (as viewed in FIGS. 2 and 6) support pin 96 is disposed in engagement with the main conductive layer 40 on the panel 36. The right (as viewed in FIG. 6) support pin 98 is disposed in engagement with the conductive strip 44 disposed on the panel 36.

The longitudinal central axes of the support pins 96 and 98 extend perpendicular to the mounting surface 47 on the panel 36. The parallel major side surfaces 74 and 76 (FIGS. 3 and 4) on the solid state light emitting element 64 extend perpendicular to the mounting surface 47 (FIGS. 2 and 6) on the base 14. Therefore, the major side surfaces 74 and 76 on the light emitting element are exposed and can transmit light to a viewer.

The support pins 96 and 98 support the solid state light emitting element 64 above and spaced from the mounting surface 47 on the base 14. This enables the seal 70 to engage the support pins 96 and 98 at a location below the solid state light-emitting element 64. Therefore, the seal 70 does not block transmission of light from the solid state light-emitting element 64. However, the seal 70 is effective to block transmission of light at a joint between the base 14 and display panel 16.

When the solid state light emitting element 64 in the light source 60 (FIG. 6) is to be energized, an electrical potential is established between the main conductive layer 38 and the conductive strip 44. Upon energization of the solid state light emitting element 64, light is transmitted from the opposite major side surfaces 74 and 76 (FIGS. 3 and 4) of the solid state light emitting element 64.

The light from the front major side surface 74 of the solid state light emitting element 64 is transmitted through the filter 132 (FIG. 5) into a panel or body 150 (FIG. 6) of transparent material, such as a clear acrylic material. Similarly, light emitted from the rear major side surface 76 (FIGS. 3 and 4) of the solid state light emitting electrode 64 is transmitted through the filter 134 (FIG. 5) into the transparent panel 150 (FIG. 6). Since the panel 150 is transparent, light is readily transmitted through the panel to an outer layer 154 formed of a translucent material. The translucent material of the outer layer 154 diffuses the light to illuminate the display surface 32 of the display section 16. The layer 28 of opaque material (FIG. 6) results in light being reflected back toward the outer layer 154 of translucent material.

Since the solid state light emitting element 64 is supported in an on-edge orientation in the recess 22, light can be transmitted in opposite directions from the light source 60 into the transparent panel 150. This enables the light source 60 to have a relatively strong intensity and to maximize the quantity of light transmitted from the solid state light-emitting element 64 when it is energized. If the solid state light emitting element was mounted with the rear major side surface 76 (FIGS. 3 and 4) facing downward toward the panel 36 in a known manner, the intensity of the light source 60 would be substantially diminished.

The resiliently compressible seal 70 is provided between the transparent panel 150 of the display section 16 and the panel 36 of the base 14 to block the leakage of light. Although it preferred to provide a separate seal member 70 in association with each of the light sources 56–62 (see FIGS. 1 and 2), a single seal member could be provided for all of the light sources if desired. The seal member 70 is formed of an electrically insulating material, that is, silicone rubber.

Conclusion

The present invention relates to a new and improved display apparatus 10 having solid state light emitting element 64 as a source of light. The solid state light emitting element 64 is mounted on a base 14 with opposite major sides 74 and 76 of the solid state light emitting element exposed. This enables light to be transmitted from opposite sides 74 and 76 of the solid state light-emitting element 64 to a viewer. A housing 12 of the display apparatus 10 includes a base 14 on which the solid state light emitting element 64 is supported in an on-edge orientation by a pair of support pins 96 and 98.

A display section 16 of the housing 12 may contain a recess 22 in which the solid state light emitting element 64 and, if desired, a filter assembly, are disposed. Light transmitted from opposite major side surfaces 74 and 76 of the solid state light emitting element 64 is conducted through transparent material 150 of the display section 16 to a translucent display surface 32.

Having described the invention, the following is claimed:

1. An apparatus comprising a base having a mounting surface, a solid state light emitting element having first and second major sides interconnected by a plurality of minor sides, mounting means extending between said mounting surface on said base and at least one of said minor sides of said solid state light emitting element for supporting said solid state light emitting element with said first and second major sides exposed and extending transversely to said mounting surface on said base to enable light to be transmitted from said first and second major sides of said solid state light emitting element, and a housing which encloses said solid state light emitting element, said housing including a display section having a body which is formed of a transparent material and which defines a recess in which said solid state light emitting element is received, said display section of said housing having an opaque inner side surface which is disposed on said body of transparent material and at least partially defines an opening to the recess in which said solid state light emitting element is received, said display section of said housing having a translucent outer side surface which extends parallel to said opaque inner side surface, said solid state light emitting element being disposed in said recess with said major sides of said solid state light emitting element facing toward said body of transparent material to enable light emitted from said major sides of said solid state light emitting element to enter said body of transparent material at a location between said opaque inner side surface and translucent outer side surface of said display section.

2. An apparatus as set forth in claim 1 wherein said mounting means includes first and second pins, said first pin being disposed in engagement with a first minor side of said plurality of minor sides on said solid state light emitting element, said second pin being disposed in engagement with a second minor side of said plurality of minor sides on said solid state light emitting element.

3. An apparatus as set forth in claim 1 wherein said mounting means supports said solid state light emitting element spaced apart from said mounting surface on said base.

4. An apparatus as set forth in claim 1 wherein said mounting means supports said solid state light emitting element with said first and second major sides of said solid state light emitting element extending perpendicular to said mounting surface.

5. An apparatus as set forth in claim 1 further including a first light filter disposed in said recess adjacent to said first major side of said solid state light emitting element to filter light emitted from said first major side of said solid state light emitting element before the light emitted from said first major side of said solid state light emitting element enters said body of transparent material, and a second light filter disposed adjacent to said second major side of said solid state light emitting element to filter light emitted from said second major side of said solid state light emitting element before the light emitted from said second major side of said solid state light emitting element enters said body of transparent material.

6. An apparatus as set forth in claim 1 further including a resiliently compressed seal disposed between said mounting surface and said opaque inner side surface of said display section to block transmission of light.

7. An apparatus as set forth in claim 1 wherein said mounting means includes first and second support members which are fixedly connected with said base, said first support member being connected with a first electrical conductor which forms a first portion of said mounting surface and said second support member being connected with a second electrical conductor which forms a second portion of said mounting surface, said first support member being connected with a cathode terminal of said solid state light emitting element, said second support member being connected with an anode terminal of said solid state light emitting element, said first and second support members being effective to support said solid state light emitting element in a spaced apart relationship with said first and second portions of said mounting surface.

8. An apparatus comprising a base having a mounting surface, a solid state light emitting element having first and second major sides interconnected by a plurality of minor sides, and mounting means extending between said mounting surface on said base and at least one of said minor sides of said solid state light emitting element for supporting said solid state light emitting element with said first and second major sides exposed and extending transversely to said mounting surface on said base to enable light to be transmitted from said first and second major sides of said solid state light emitting element, said mounting means includes a first mounting pin having a cylindrical outer side surface and a ledge formed by a flat radially extending side surface and a flat axially extending side surface, a first one of said plurality of minor side surfaces on said solid state light emitting element being connected with said flat axially extending side surface on said first mounting pin, and a second mounting pin having a cylindrical outer side surface and a ledge formed by a flat radially extending side surface and a flat axially extending side surface, a second one of said plurality of minor side surfaces on said solid state light emitting element being connected with said flat axially extending side surface on said second mounting pin.

9. An apparatus as set forth in claim 8 further including a housing which encloses said solid state light emitting element, said housing including a display section having body which is formed of a transparent material and which defines a recess in which said solid state light emitting element is received, said display section of said housing having an opaque inner side surface which is disposed on said body of transparent material, said display section of said housing having a translucent outer side surface, said solid state light emitting element being disposed in said recess with said major sides of said solid state light emitting element facing toward said body of transparent material to enable light emitted from said major sides of said solid state light emitting element to enter said body of transparent material at a location between said opaque inner side surface and translucent outer side surface of said display section.

10. An apparatus as set forth in claim 9 further including a first light filter disposed in said recess adjacent to said first major side of said solid state light emitting element to filter light emitted from said first major side of said solid state light emitting element before the light emitted from said first major side of said solid state light emitting element enters said body of transparent material, and a second light filter disposed adjacent to said second major side of said solid state light emitting element to filter light emitted from said second major side of said solid state light emitting element before the light emitted from said second major side of said solid state light emitting element enters said body of transparent material.

11. An apparatus as set forth in claim 9 further including a resiliently compressed seal disposed between said mounting surface and said opaque inner side surface of said display section to block transmission of light.

12. An apparatus comprising a base, a layer of transparent material which is connected with said base and at least partially defines a recess, a layer of translucent material connected with said layer of transparent material, said layer of transparent material being at least partially disposed between said base and said layer of translucent material, a solid state light emitting element having first and second major sides from which light is emitted when said solid state light emitting element is energized, first and second mounting pins connected with said base and said solid state light emitting element to support said solid state light emitting element in said recess in a spaced apart relationship with said base and with said first and second major sides of said solid state light emitting element extending transverse to said layer of translucent material and facing toward surface areas which partially define said recess and are disposed on said layer of transparent material.

13. An apparatus as set forth in claim 12 wherein said first mounting pin is disposed in engagement with a first minor side of said plurality of minor sides on said solid state light emitting element, said second mounting pin being disposed in engagement with a second minor side of said plurality of minor sides on said solid state light emitting element.

14. An apparatus as set forth in claim 13 wherein said first and second mounting pins are disposed in engagement with a third minor side of said solid state light emitting element, said third minor side on said solid state light emitting element extends between said first and second minor sides on said solid state light emitting element.

15. An apparatus as set forth in claim 12 further including a first light filter disposed in said recess adjacent to said first major side of said solid state light emitting element to filter light emitted from said first major side of said solid state light emitting element before the light emitted from said first side of said solid state light emitting element enters said layer of transparent material, and a second light filter disposed in said recess adjacent to said second major side of said solid state light emitting element to filter light emitted from said second major side of said solid state light emitting element before the light emitted from said second side of said solid state light emitting element enters said layer of transparent material.

16. An apparatus comprising a base having a mounting surface, a solid state light emitting element having first and second major sides interconnected by a plurality of minor sides, mounting means extending between said mounting surface on said base and minor sides of said solid state light emitting element for supporting said solid state light emitting element with said first and second major sides exposed and extending transversely to said mounting surface on said base to enable light to be transmitted from said first and second major sides of said solid state light emitting element, said mounting means includes first and second pins, said first pin being disposed in engagement with a first minor side of said plurality of minor sides on said solid state light emitting element, said second pin being disposed in engagement with a second minor side of said plurality of minor sides on said solid state light emitting element, said first minor side of said plurality of minor sides being disposed on a first end portion of said solid state light emitting element, said second minor side of said plurality of minor sides being disposed on a second end portion of said solid state light emitting element, said second end portion of said solid state light emitting element being spaced from said first end portion of said solid state light emitting element, and a housing which encloses said solid state light emitting element, said housing including a display section having body which is formed of a transparent material and which at least partially defines a recess in which said solid state light emitting element is received, said display section of said housing being connected with said base, said first and second pins extending from said base into said recess, said solid state light emitting element being connected with end portions of said first and second pins disposed in said recess with said major sides of said solid state light emitting element facing toward said body of transparent material to enable light emitted from said major sides of said solid state light emitting element to enter said body of transparent material.

17. An apparatus comprising a base having a mounting surface, a solid state light emitting element having first and second major sides interconnected by a plurality of minor sides, and mounting means extending between said mounting surface on said base and minor sides of said solid state light emitting element for supporting said solid state light emitting element with said first and second major sides exposed and extending transversely to said mounting surface on said base to enable light to be transmitted from said first and second major sides of said solid state light emitting element, said mounting means includes first and second pins, said first pin being disposed in engagement with a first minor side of said plurality of minor sides on said solid state light emitting element, said second pin being disposed in engagement with a second minor side of said plurality of minor sides on said solid state light emitting element, said first minor side of said plurality of minor sides being disposed on a first end portion of said solid state light emitting element, said second minor side of said plurality of minor sides being disposed on a second end portion of said solid state light emitting element, said second end portion of said solid state light emitting element being spaced from said first end portion of said solid state light emitting element, said first pin has a cylindrical outer side surface and a flat axially extending side surface, said first minor side surface on said solid state light emitting element being connected with said flat axially extending side surface on said first pin, said second pin has a cylindrical outer side surface and a flat axially extending side surface, said second minor side surface on said solid state light emitting element being connected with said flat axially extending side surface on said second pin.

18. An apparatus comprising a base having a mounting surface, a solid state light emitting element having first and second major sides interconnected by a plurality of minor sides, a first mounting pin having a first end portion connected with said base and a second end portion connected with said solid state light emitting element, said second end portion of said first mounting pin being disposed in engagement with first and second minor sides of said plurality of minor sides on said solid state light emitting element, a second mounting pin having a first end portion connected with said base and a second end portion connected with said solid state light emitting element, said second end portion of said second mounting pin being disposed in engagement with said second minor side and with a third minor side of said plurality of minor sides on said solid state light emitting element, and a layer of transparent material which is connected with said base and a layer of translucent material connected with said layer of transparent material, said layer of transparent material at least partially defining a recess which is disposed between said base and said layer of translucent material, said second end portions of said mounting pins and said solid state light emitting element being disposed in said recess with said major sides of said solid state light emitting element extending transverse to said layer of translucent material and facing toward surface areas which partially define said recess and are disposed on said layer of transparent material.

* * * * *